_United States Patent Office_

3,758,424
Patented Sept. 11, 1973

3,758,424
FOAMED POLYMERIC MATERIALS
Norman Stewart Anderson, Manchester, England, assignor to Imperial Chemical Industries Limited, London, England
No Drawing. Continuation of abandoned application Ser. No. 94,563, Dec. 2, 1970. This application May 5, 1972, Ser. No. 250,654
Int. Cl. C08j 1/18
U.S. Cl. 260—2.5 N    9 Claims

ABSTRACT OF THE DISCLOSURE

Manufacture of polyamide foam, by mixing polyamide with a blowing agent comprising an oxalic acid derivative wherein one COOH group has been esterified with an alcohol or polyol and the other has been either esterified with an alcohol, polyol or phenol or converted to a substituted amide, and heating above the melting point. Esterification products of oxalic acid with polyols, especially ethylene glycol, are preferred.

---

This is a continuation of application Ser. No. 94,563, filed Dec. 2, 1970, now abandoned.

This invention relates to the manufacture of polyamide foams.

The term polyamide refers to the thermoplastic polymers which are obtained by polycondensation of diamines with di-carboxylic acids, or self-condensation of amino acids or lactams. More particularly it refers to those linear polyamides which have fibre-forming characteristics and are termed "nylon." Specifically it includes:

polyhexamethyleneadipamide (nylon 6:6)
polycaprolactam (nylon 6)
polyundecanolactam (nylon 11)
polydodecanolactam (nylon 12)
polyhexamethylene sebacamide (nylon 6:10)
polyhexamethylene isophthalimide (nylon 6:iP)
polyhexamethylene terephthalimide (nylon 6:T)
polymetaxylylene adipamide (nylon MXD:6)

and copolymers therefrom.

Many foamed thermoplastic materials are known and some, for example foamed polystyrene, are now in widespread use for decorative and insulation purposes. Despite the ready availability of polyamides (nylons) particularly nylon 6.6 it is remarkable that foams from these materials have not yet proved commercially successful. One of the difficulties encountered in producing satisfactory foamed polyamides is the inherent unsuitability of the blowing agents which are used with other plastic materials. With polyamides these blowing agents usually give comparatively poor results. It is not possible to select blowing agents for nylon by reference to the intrinsic properties of known compounds, for characteristics such as the rate of gas production and the length of any induction period are much affected by the nylon itself.

It is known to produce expandable polyamide compositions by heating polyamide-forming substances in the presence of carboxylic acid esters as expanding agents (particularly an ester of a carboxylic acid with 1 to 3 carbon atoms and a polyhydric alcohol) and of hydroxyalkyl diamines or their salts with dicarboxylic acids to temperatures at which condensation but no foam formation occurs until the polyamide formed is at least partly soluble in concentrated sulphuric acid. In this process the hydroxyalkyl diamine acts as a cross-linking agent and the product is a cross-linked polyamide. Production of the expandable polyamide compositions requires a prolonged heating in presence of the carboxylic ester, which tends to decompose at least partially during such heating. Moreover foam production from the expandable polyamide compositions involves heating to temperatures above the condensation temperature and cooling from such high temperatures has to be slow in order to avoid collapsing of the foam.

The present invention provides a process in which polyamide foams can be made in simple manner from the polyamides themselves, as distinct from polyamide-forming substances. The process may use lower temperatures and shorter heating times than the known process and the disadvantages of the known process may thereby be avoided.

According to the invention a process for the manufacture of polyamide foam comprises mixing a normally solid polyamide with a blowing agent comprising an oxalic acid derivative wherein one COOH group has been esterified with an alcohol or polyol and the other COOH group has been either esterified with an alcohol, polyol or phenol or converted to a substituted amide group, and heating the mixture above the melting point of the polyamide.

It is preferred to use in the process of the invention a polyamide of high molecular weight since polyamides of low molecular weight have low melt viscosities which tend to render the foam unstable. The relative viscosity of the preferred high molecular weight polyamides (as measured on an 8.4% by weight solution in 90% formic acid/water) is at least 20 and preferably 40 to 50. When polyamides having lower relative viscosities than this are used in the process of the invention it is desirable in such cases to carry out the heating in presence of a cross-linking agent to increase the molecular weight.

The blowing agent used in the process of the invention may comprise an oxalic acid derivative of the formula

RO—CO.CO—X wherein R is an aliphatic radical and X is a radical of the formula —OR, —OAr (where Ar is an aromatic radical) or —NR₁R₂ where R₁ is an aliphatic or aromatic radical, R₂ is hydrogen or an aliphatic or aromatic radical, or R₁ and R₂ together represent the atoms necessary to form a heterocyclic group together with or excluding the amide nitrogen atom.

In the oxalic acid derivatives of the above formula:

the radical R may be, for example, a straight or branched chain alkyl radical, particularly of from 1 to 12 carbon atoms, e.g. methyl, ethyl, lauryl. (Such radicals may be substituted, for example by hydroxy or alkoxy e.g. methoxy groups):
an aryl radical represented by Ar may be for example phenyl or tolyl:
aliphatic radicals represented by R₁ and R₂ may be for example alkyl radicals, particularly of from 1 to 6 carbon atoms e.g. methyl, ethyl, propyl or butyl:
aryl radicals represented by R₁ and R₂ may be for example phenyl or tolyl:
heterocyclic radicals formed by R₁, R₂ and the nitrogen atom may be for example piperidyl:
heterocyclic radicals formed by R₁ and R₂ may be for example triazinyl.

Specific blowing agents of the above formula are:

n-C₄H₉OCO.CONH(CH₂)₆NHCO.COOC₄H₉(n)    I
C₂H₅OCO.CONH(CH₂)₆NHCO.COOC₂H₅    II
CH₃OCH₂CH₂OCO.COOCH₂CH₂OCH₃    III
CH₃(CH₂)₃CH(C₂H₅)CH₂OCO.COOCH₂CH(C₂H₅)(CH₂)₃CH₃    IV
C₁₂H₂₅OCO.COOC₁₂H₂₅    V
C₂H₅OCO.CONHC₆H₅    VI
C₂H₅OCO.COOC₆H₄OCO.COOC₂H₅    VII

It is preferred in the invention to employ as blowing agent an ester formed by esterification of oxalic acid with a polyol, particularly ethylene glycol. Esters made in this way are mainly polymeric and may contain several individual compounds. Mixtures of esters produced by the direct esterification process may be used, such mixtures being for convenience designated polyesters. Thus for example the product obtained by esterifying oxalic acid with ethylene glycol is designated poly(ethylene oxalate).

The proportion of blowing agent relative to polyamide may be for example from 0.1 to 10% by weight depending upon the particular blowing agent and polyamide used and the density of foam wanted. In general proportions of 0.5 to 3% by weight are preferred.

To carry out the process thermoplastic polymer in powder, chip or granule form may be mixed with the blowing agent and subsequently heated above the melting point until foaming occurs, or the blowing agent can be introduced into an already molten polymer. Conveniently heating of a mixture of polymer and blowing agent may be commenced in an extruder, from which the mixture is extruded and allowed to foam and cool. Alternatively an injection moulding machine preferably of the reciprocating screw type may be used to make foamed moulded shapes by means of the process of the invention. If desired the invention may be used in the production of articles having a cellular core and an unfoamed surface skin by the method described and claimed in our United Kingdom Pat. No. 1,156,217.

If desired a surface active agent, preferably of the non-ionic type, may be present during heating of the polymer and blowing agent in order to preserve a fine dispersion of gas bubbles during the transition to rigid foam. The use of surface active agents in the production of polyamide foams is within the claims of our United Kingdom Pat. No. 1,208,782 (application No. 26,793/67). Some of the most effective surface active agents are alkylphenols, alkanols or alkylamines containing at least 6 carbon atoms, and condensates thereof with an alkylene oxide preferably containing from 1 to 30 moles of alkylene oxide. Especially effective surface active agents are alkanols containing 10 to 20 carbon atoms e.g. cetyl alcohol and condensates of such alcohols with up to 5 moles of alkylene oxide e.g. ethylene oxide. The product of this type which is sold by Imperial Chemical Industries Limited under the name Lubrol MOA (Registered trademark) is particularly effective. Other especially effective surface active agents are condensates of alkylamines, containing 10 to 20 carbon atoms, with up to 5 moles of alkylene oxide e.g. ethylene oxide. The product of this type which is sold by Armour Hess Chemicals Limited under the name Ethomeen S/12 is particularly effective.

Polyamide foams produced by the invention are light in weight but have good strength. They have potential for use in the manufacture of a variety of light-weight load-bearing structures, for example in the building and furniture industries.

The invention is illustrated but not limited by the following examples in which all relative viscosities are measured on an 8.4% solution in 90% formic acid/water.

EXAMPLE 1

Nylon 6.6 (25 g., having a relative viscosity of 46) Ethomeen S/12 (0.5 ml.) and water (0.5 ml.) were heated under nitrogen in a glass tube in a vapour bath at 280° C. until molten and stirred for 5 minutes. 1,6-bis-(butoxydicarbonylamino)-hexane (Formula I, 0.75 g.) was added and the mixture was stirred for 1 minute before removing the stirrer. Foaming commenced immediately. 10 minutes after addition of the blowing agent, heating was discontinued and the foam was allowed to cool.

The cylinder of foam obtained was tough with an even texture and yellow in colour. The ends of the cylinder were sawn off leaving a flat-ended cylinder of density 0.13 g./cc.

EXAMPLE 2

Example 1 was repeated using 1,6-bis(ethoxydicarbonylamino)-hexane (Formula II, 0.75 g.) in place of the butoxy analogue. A flat-ended cylinder of foam of density 0.12 g./cc. was obtained.

EXAMPLE 3

A copolymer of nylon 6.6 and hexamethylene isophthalamide (of molar proportions 90:10 and of relative viscosity 43) was dried in vacuo at 100° C. for 24 hours. It was then tumble blended with a silica nucleant (0.2% by weight) and poly-(ethylene oxalate) (2% by weight; material which had passed through a 30 mesh screen). Lubrol MOA (2% volume/weight) was then added and tumble blended with the coated chips. The chips coated with surfactant, blowing agent and nucleant were then further dried in a vacuum oven at 80° C. for 16 hours.

The coated chips were fed into one barrel of a two-shot injection moulding machine. The barrel temperatures, registered by thermocouples were 250° C. (rear), 260° C. (middle) and 275° C. (front). Into the second barrel of the injection moulding machine was fed a dried copolymer of nylon 6.6 and hexamethylene isophthalamide (of molar proportions 90/10 and of RV 43). The untreated copolymer and the foamable composition were injection moulded by the technique described in U.K. specification 1,156,217 to give panels with a non-foamed skin and a foamed core. The mouldings were about 1 cm. thick, and had good impact strengths.

The starting polymer used for both the non-foamed skin and the foamed core had the following characteristics; RV=43; amine end groups (AEG)=60 equivs. per $10^6$ g.; carboxyl end groups (CEG)=71 equivs. per $10^6$ g. After moulding, both the skin and the foamed polymer had RV's of 37. The foam had a AEG of 9 and a CEG of 31.

From this it is deductible that the molecular weight of the polymer is substantially unchanged after foaming but that the blowing agent reacts with the polymer end groups, mainly with the amine end groups.

EXAMPLE 4

Nylon 11 (25 g.), Lubrol MOA (0.5 ml.) and water (0.1 ml.) were heated under nitrogen in a glass tube in a vapour bath at 198° C. until molten. The mixture was stirred for about 1 minute and then the stirrer was stopped. Poly(ethylene oxalate) (0.75 g.) was added to the melt and the mixture stirred for about 1 minute. The stirrer was then removed from the melt and heating was continued for a further 9 minutes and then switched off. The foam was allowed to cool to room temperature. As it cooled it partly collapsed.

The foam was white, tough and flexible. After squaring off the ends, the cylinder of foam had a density of 0.18 g./cc.

EXAMPLE 5

Nylon 6.6 (25 g.) having a relative viscosity of 46, Lubrol MOA (0.5 ml.) and water (0.1 ml.) were heated under nitrogen in a glass tube in a vapour bath at 280° C. until molten and stirred for 2 minutes. Poly-(trimethylene oxalate) (0.75 g.) was added and the mixture stirred for 30 seconds before removing the stirrer. 5½ minutes after adding the blowing agent, heating was discontinued and the foam was allowed to cool to room temperature.

A tough yellowish foam was obtained. After squaring off the ends, the cylinder of foam had a density of 0.23 g./cc.

EXAMPLE 6

Example 5 was repeated using bis-(2-methoxyethyl) oxalate (Formula III) as blowing agent in place of the poly(trimethylene oxalate). The yellowish foam partly collapsed on cooling. After squaring off the ends, the cylinder of foam had a density of 0.17 g./cc.

EXAMPLE 7

Nylon 6 (25 g.), Lubrol MOA (0.5 ml.) and water (0.3 ml.) were heated under nitrogen in a glass tube in a vapour bath at 240° C. until molten and the melt stirred for 1 minute. Poly(ethylene oxalate) (0.75 g.) was added and the mixture was stirred for 1 minute. The stirrer was then lifted clear of the melt. Heating was continued for a further 6 minutes and then switched off. The foam was then allowed to cool to room temperature.

The foam was yellow in colour and tough. Foam texture was mostly even but with a few larger voids. After squaring off the ends, the cylinder of foam had a density of 0.2 g./cc.

EXAMPLE 8

Nylon 6 (25 g.), Lubrol MOA (0.5 ml.) and water (0.3 ml.) were heated under nitrogen in a glass tube in a vapour bath at 240° C. until molten. A polyester was made by heating equivalent amounts of glycerol and di-ethyloxalate and distilling out the ethanol. The resultant gummy material (0.75 g.) was weighed onto a piece of thin polythene film and screwed into a pellet. The pellet was dropped onto the nylon melt and stirred in for 30 seconds. The stirrer was then removed from the melt. Heating was continued for a further 2½ minutes and then switched off, and the foam allowed to cool.

The ends of the cylinder of foam were squared off, leaving a cylinder of density of 0.16 g./cc. The yellowish foam was tough but the texture was uneven.

EXAMPLE 9

Nylon 6 (25 g.), Lubrol MOA (0.5 ml.) and water (0.3 ml.) were heated in a glass tube under nitrogen in a vapour bath at 240° C. until molten, and then stirred for 1 minute. Poly(tetramethylene oxalate) (0.75 g.) was added and the mixture was stirred for 1 minute. The stirrer was withdrawn from the polymer melt and heating was continued for a further 6 minutes and then switched off. The foam was allowed to cool to room temperature.

The ends of the foam were sawn off leaving a flat-ended cylinder of foam of density of 0.25 g./cc. The foam was slightly yellowish in colour. It was tough, but the foam texture was rather uneven.

EXAMPLE 10

Nylon 6.6 (25 g.) having a relative viscosity of 46, Lubrol MOA (0.5 ml.) and water (0.2 ml.) were heated under nitrogen in a glass tube in a vapour bath at 280° C. until molten and stirred for 2 minutes. Dilauryl oxalate (Formula V, 0.75 g.) was added to the melt and stirred in for half a minute. The stirrer was then removed from the melt and heating continued for a further 5 minutes, then switched off. The tube was allowed to cool to room temperature.

A foam with a fine even structure was produced which on cooling partly collapsed in the middle. The foam was white and tough. After squaring off the ends of the cylinder of foam, its density was measured as 0.24 g./cc.

EXAMPLE 11

Example 10 was repeated using di-iso-octyl oxalate (Formula IV) in place of dilauryl oxalate.

A white foam, which partly collaped on cooling, was obtained. After squaring off the ends, its density was measured as 0.23 g./cc.

EXAMPLE 12

Nylon 6.6 (25 g.) of relative viscosity 46, Lubrol MOA (0.5 ml.) and water (0.1 ml.) were heated under nitrogen in a glass tube in a vapour bath at 280° C. until molten and stirred for 1 minute. Ethoxydicarbonylaminobenzene (Formula VI, 0.75 g.) was added and stirred in for half a minute. The stirrer was removed from the melt and heating was continued for 3 minutes more, before switching it off. The foam was then allowed to cool to room temperature.

A yellowish foam of fine even structure was produced. After squaring off the ends of the cylinder of foam, its density was measured as 0.12 g./cc.

EXAMPLE 13

Nylon 11 (25 g.) and Lubrol MOA (0.5 ml.) and water (0.1 ml.) were placed in a polymer tube fitted with a stirrer, under a blanket of nitrogen. The tube was heated in a vapour bath at 198° C. When molten the contents were stirred for 10 minutes. To serve as blowing agent 1,4-bis(ethoxydicarbonyloxy)-benzene (Formula VII 0.75 g. in pellet form) was added to the melt and stirred in for half a minute. The stirrer was then removed and the foam allowed to rise. Five minutes after removing the stirrer, the heat was switched off and the foam allowed to cool in the vapour bath.

The resulting yellow/white foam had a density of 0.5 g./cc.

I claim:

1. A process for the manufacture of polyamide foam comprising mixing a normally solid polyamide with from 0.1 to 10% by weight of a blowing agent consisting essentially of an oxalic acid derivative of the formula

wherein R is a straight or branched chain alkyl or alkoxy-alkyl radical of 1 to 12 carbon atoms and X is a radical of the formula —OR or —OAr, where Ar is an aromatic radical of the benzene series.

2. Process according to claim 1 wherein the blowing agent is selected from the class consisting of oxalic acid derivatives having the following formulae:

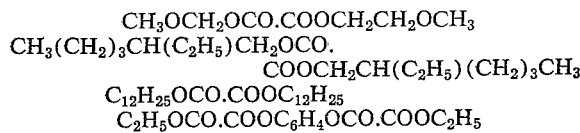

3. Process according to claim 1 wherein the blowing agent is an ester formed by esterification of oxalic acid with a polyol.

4. Process according to claim 1 wherein the blowing agent is an ester formed by esterification of oxalic acid with ethylene glycol.

5. Process according to claim 1 carried out in presence of a surface active agent of non-ionic type.

6. Process according to claim 4 carried out in presence of a surface active agent of non-ionic type.

7. Process according to claim 5 wherein the surface active agent is an alkylphenol, alkanol or alkylamine containing at least 6 carbon atoms or a condensate thereof with from 1 to 30 moles of an alkylene oxide.

8. Process according to claim 6 wherein the surface active agent is an alkylphenol, alkanol or alkylamine containing at least 6 carbon atoms or a condensate thereof with from 1 to 30 moles of an alkylene oxide.

9. A process for the manufacture of polyamide foam which comprises mixing a normally solid polyamide with from 0.1 to 10% by weight of a blowing agent and heating the mixture above the melting point of the polyamide, the blowing agent consisting essentially of an oxalic acid derivative wherein one COOH group has been esterified with an alcohol or polyol and the other has been esterified with an alcohol, polyol, phenol or polyhydroxy aromatic compound.

References Cited

UNITED STATES PATENTS

| | | | |
|---|---|---|---|
| 3,041,294 | 6/1962 | Becke et al. | 260—2.5 N |
| 3,060,135 | 10/1962 | Becke et al. | 260—2.5 N |
| 3,376,237 | 4/1968 | Fuller | 260—2.5 N |
| 3,232,892 | 2/1966 | Fisher | 260—2.5 M |

MURRAY TILLMAN, Primary Examiner

M. FOELAK, Assistant Examiner

UNITED STATES PATENT OFFICE
CERTIFICATE OF CORRECTION

Patent No. 3,758,424                   Dated September 11, 1973

Inventor(s) Norman Stewart Anderson

It is certified that error appears in the above-identified patent and that said Letters Patent are hereby corrected as shown below:

In the heading Foreign Application Priority Data should be added as follows:

-- Jan. 16, 1970   Great Britain      2245/70 --

Signed and sealed this 6th day of August 1974.

(SEAL)
Attest:

McCOY M. GIBSON, JR.              C. MARSHALL DANN
Attesting Officer                 Commissioner of Patents